United States Patent
Lin et al.

(10) Patent No.: US 9,774,209 B2
(45) Date of Patent: Sep. 26, 2017

(54) SELECTIVE POWER DISTRIBUTION DURING WIRELESS CHARGING

(71) Applicant: BROADCOM CORPORATION, Irvine, CA (US)

(72) Inventors: Ming Yu Lin, Tustin, CA (US); Lee Song Cher, Singapore (SG); Khim Leng Low, Singapore (SG); John Stuart Walley, Ladera Ranch, CA (US); Domitille Odile Emmeline Esnard-Domerego, Biot (FR); Yasantha Nirmal Rajakarunanayake, San Ramon, CA (US); Angel Arturo Polo, Solana Beach, CA (US)

(73) Assignee: AVAGO TECHNOLOGIES GENERAL IP (SINGAPORE) PTE., Singapore (SG)

( * ) Notice: Subject to any disclaimer, the term of this patent is extended or adjusted under 35 U.S.C. 154(b) by 412 days.

(21) Appl. No.: 14/143,753

(22) Filed: Dec. 30, 2013

(65) Prior Publication Data

US 2015/0097520 A1 Apr. 9, 2015

Related U.S. Application Data

(60) Provisional application No. 61/886,342, filed on Oct. 3, 2013.

(51) Int. Cl.
*H02J 7/00* (2006.01)
*H02J 7/02* (2016.01)
(Continued)

(52) U.S. Cl.
CPC .......... *H02J 7/025* (2013.01); *H02J 13/0075* (2013.01); *H02J 17/00* (2013.01)

(58) Field of Classification Search
CPC .. H02J 7/025; H02J 17/00; H02J 5/005; H02J 7/0063; H02J 7/0065; H02J 7/0068;
(Continued)

(56) References Cited

U.S. PATENT DOCUMENTS

2009/0291634 A1* 11/2009 Saarisalo .......... H04M 1/72527
455/41.1
2010/0036773 A1* 2/2010 Bennett .............. G06Q 20/3674
705/67
(Continued)

*Primary Examiner* — Richard Isla Rodas
*Assistant Examiner* — David V Henze-Gongola
(74) *Attorney, Agent, or Firm* — Garlick & Markison; Harry S. Tyson, Jr.

(57) ABSTRACT

Power distribution circuitry to improve wireless power distribution and facilitate wireless power transfer (WPT) operations in a wireless communication device under a variety of operating conditions. In various exemplary embodiments of the disclosure, the power distribution circuitry operates to provide a wireless power (WP) supply voltage to wireless communication circuitry of the device in order enable a WPT connection procedure under certain low power conditions. Such conditions might include a power off mode, a sleep mode, and dead/low battery operating conditions wherein the available battery supply voltage is less than a threshold voltage required to enable device components. The power distribution circuitry may switch the supply voltage of the wireless communication circuitry to another available supply voltage source after the WPT connection procedure is completed and wireless power is being received by the wireless communication device.

20 Claims, 8 Drawing Sheets

(51) Int. Cl.
*H02J 13/00* (2006.01)
*H02J 17/00* (2006.01)

(58) Field of Classification Search
CPC .. H02J 50/10; H02J 50/12; H02J 50/15; H02J 50/20; H02J 50/23; H02J 50/27; H02J 50/40; H02J 50/70; H02J 50/80; H04W 52/0274; H04W 52/0277; H04W 52/028; H04W 52/0283
USPC .......................................................... 320/108
See application file for complete search history.

(56) References Cited

U.S. PATENT DOCUMENTS

| | | | |
|---|---|---|---|
| 2012/0091799 A1* | 4/2012 | Rofougaran | H02J 1/10 307/24 |
| 2012/0309308 A1* | 12/2012 | Kim | B60L 11/182 455/41.1 |

* cited by examiner

| Case | Power Sup/ Com. Cir. On? | WP Available? | Main Power | VBAT vs. VWPT | PMU Mode | Remarks |
|---|---|---|---|---|---|---|
| 0 | N | N | VBAT/VDD | — | OFF | — |
| 1 | N | Y | VWPT | — | WPT | — |
| 2 | Y | N | VBAT/VDD | — | Active/Sleep | Active/Sleep per host control |
| 3a | Y | Y | VBAT/VDD | VBAT > VWPT | Active Only | PMU Sleep disabled |
| 3b | Y | Y | VWPT/VBAT/VDD | VBAT < VWPT | Active Only | WP used for wireless com. circuitry (e.g., PA) |

FIG. 8

SELECTIVE POWER DISTRIBUTION DURING WIRELESS CHARGING

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Patent Application Ser. No. 61/886,342, entitled "SELECTIVE POWER DISTRIBUTION DURING WIRELESS CHARGING," filed Oct. 3, 2013, pending.

BACKGROUND

Technical Field

The disclosure relates generally to powering mobile devices and, more particularly, it relates to distribution of power from various sources within such devices.

Description of Related Art

Battery-powered electronic devices, such as smart phones, e-readers, handheld gaming devices, tablet computing devices and laptop computers, typically include a platform power management unit (PMU) having a battery charger for charging an internal battery using power received from an external source (such as a wall adapter or a Universal Serial Bus (USB) port) and other devices. In recent years, manufacturers of such devices have begun including wireless power transfer (WPT) capabilities in such devices in order to enable charging of internal batteries from a wireless power source without the use of a wired connection.

Various technologies may be employed for wireless power transfer, including magnetic induction charging and magnetic resonance charging. The Rezence™/WiPower™ specification promulgated by the Alliance for Wireless Power (A4WP) is one example of a current WPT approach that utilizes magnetic resonance charging. The Qi™ specification promulgated by the Wireless Power Consortium (WPC) relies on a magnetic induction charging approach. In order to facilitate battery charging operations, certain WPT systems utilize bi-directional communications between source and recipient devices. For example, communication between devices may include out-of-band signaling utilizing a low energy wireless protocol, such as Bluetooth™ Low Energy or NFC protocol.

DETAILED DESCRIPTION

Figure 1:
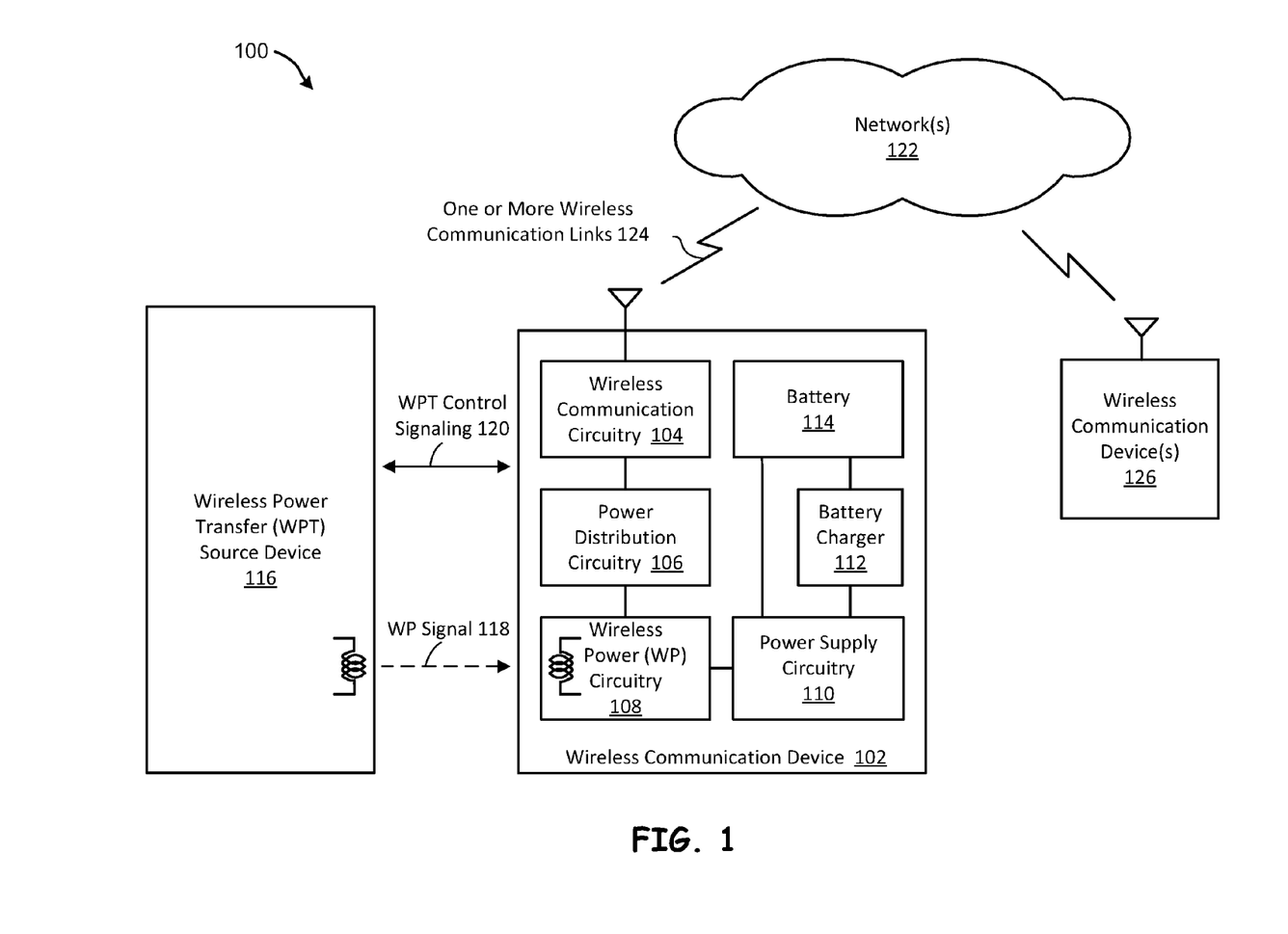
FIG. 1 illustrates an exemplary network including a wireless communication device having wireless power transfer capabilities.

FIG. 1 illustrates an exemplary network 100 including a wireless communication device 102 having wireless power transfer capabilities. In the illustrated embodiment, the wireless communication device 102 is configured to receive wireless power from a wireless power transfer (WPT) source device 116 via a wireless power (WP) signal 118. As described more fully below, power distribution circuitry 106 is provided to facilitate WPT operations and manage wireless power distribution within the wireless communication device 102 under a variety of operating conditions.

In addition to the power distribution circuitry 106, the wireless communication device 102 includes wireless communication circuitry 104 and wireless power (WP) circuitry 108 that support WPT operations. In various exemplary embodiments, the WP circuitry 108 is configured to generate a wireless power (WP) supply voltage from the WP signal 118. The power distribution circuitry 106 operates to distribute this WP supply voltage (and regulated supply voltages generated therefrom) to enable selected circuitry within the wireless communication device 102 to facilitate battery charging operations.

The power distribution circuitry 106 functions to improve power consumption in a device incorporating WPT charging capabilities. For example, a wireless communication device 102 incorporating WPT capabilities may host a number of other resources such as an application processor, flash memories, a display, a multi-mode connectivity/communication integrated circuit, etc., that rely on battery power during normal operation. In order to support wireless charging that relies on a WPT wireless control channel, the wireless communication circuitry 104 in the wireless communication device 102 may be utilized to perform a WPT connection procedure or protocol. Such a procedure may be time consuming, and consume unnecessary power if certain other devices resources are powered up in conjunction with the wireless communication circuitry 104.

Instead of powering up an entire device platform to enable wireless charging, the power distribution circuitry 106 of certain exemplary embodiments distributes power only to relevant device resources, thereby expediting the initial boot cycle and minimizing unnecessary power consumption by circuitry that is not required during the WPT connection procedure. This approach may be especially useful in scenarios where a device's battery is discharged or the device is in a low power/sleep state and platform power management circuitry (e.g., power supply circuitry 110) and/or wireless communication circuitry 104 are disabled. Such conditions might include, for example, a device power off mode, a device sleep mode, and dead battery or low battery situations wherein the available battery supply voltage is less than a threshold voltage required to enable device components. Further, the power distribution circuitry 106 may facilitate seamless and/or automatic switching of power modes—without requiring a power cycle of the device—when other power sources (e.g., a battery) are available and partial or full device functionality is desired.

For example, when a WP signal 118 is available, the power distribution circuitry 106 may provide one or more regulated WP supply voltages to wireless communication circuitry 104 or portions thereof in order to enable the wireless communication circuitry 104 to perform a WPT connection procedure with the WPT source device 116. The power distribution circuitry 106 may include one or more circuits (e.g., linear regulators, DC-to-DC converters, etc.) that can be selectively enabled as described herein to generate the one or more regulated WP supply voltages. Following completion of a WPT connection procedure, the power distribution circuitry 106 may then utilize a system power supply, battery power, or another available power source to supply power to all or portion(s) of the wireless communication circuitry 104.

In certain embodiments, when the WPT source device 116 and wireless communication device 102 are within sufficient proximity, a wireless communication channel or link may be established via WPT control signaling 120 in order to support device discovery and WPT connection procedures. The communication channel or link can be implemented by the wireless communication circuitry 104 using a variety of wireless communication protocol(s), including WiFi™, Bluetooth™/Bluetooth™ LE, near field communications (NFC), etc. The WPT control signaling 120 can include data, commands and/or other communications to facilitate transfer of power from the WPT source device 116 to the wireless communication device 102.

The power supply circuitry 110 is configured, when enabled, to generate one or more system supply voltages from a battery voltage supplied by battery 114. In various exemplary embodiments, the power supply circuitry 110 may include or be integrated within a power management unit (PMU) or like circuitry. A battery charger 112 is provided to charge the battery 114 using power provided by the power supply circuitry 110, which may be derived from power received from the WP circuitry 108. The battery charger 112 may be a standalone module or, in certain embodiments, integrated within the power supply circuitry 110.

The battery 114 may have a variety of configurations and include a variety of battery types. For example, the battery 114 may be comprised of a single cell battery, a series dual-cell battery, etc., and utilize different types of batteries, such as lithium-ion batteries, thin film lithium-ion batteries, lithium-polymer batteries, etc. In addition to wireless power from a WPT source device 116, the battery 114 may be charged through the use of an external power adapter such as an AC power adapter (not shown) that plugs into a wall outlet and provides a regulated DC output voltage. Battery charging might also occur via a standardized connection such as a Universal Serial Bus (USB) link.

In the illustrated embodiment, the wireless communication circuitry 104 further processes signals for wireless communications with network(s) 122 via one or more wireless communication links 124. The wireless communication links 124 may operate in accordance with a variety of communication and networking protocols (TCP/IP, UPnP, IPv6, etc.) and standards (3G, 4G, IMT-Advanced, WiFi™/ 802.11x, WiMax™, Bluetooth™, etc.). In addition, the communication links may comprise a picocell, femtocell, metrocell, heterogeneous network (HetNet) and/or multi-hop network utilizing a spanning tree protocol, direct wireless connections, peer-to-peer links, etc. The wireless communication device 102 may communicate with other stationary or mobile wireless communication device(s) 126 via the network(s) 122.

The wireless communication device 102 may be, without limitation, a smartphone, tablet device, portable navigation device, personal media player, handheld game console, headset, camera, etc. The WPT source device 116 may be, without limitation, a charging station, a power mat, a power pad, or a power dock. Depending on the type of wireless power transfer technology that is employed, wireless charging may be performed by placing the wireless communication device 102 on the WPT source device 116 in either a specified manner or in no particular orientation.

In addition, while certain embodiments of the disclosure are described for use in mobile communication devices, various aspects and principles and their equivalents can also be extended generally to other types of devices that are designed to rely, at least in part, on battery power. In some instances, structures and components described herein are illustrated in block diagram form in order to avoid obscuring the concepts of the subject technology.

Figure 2:
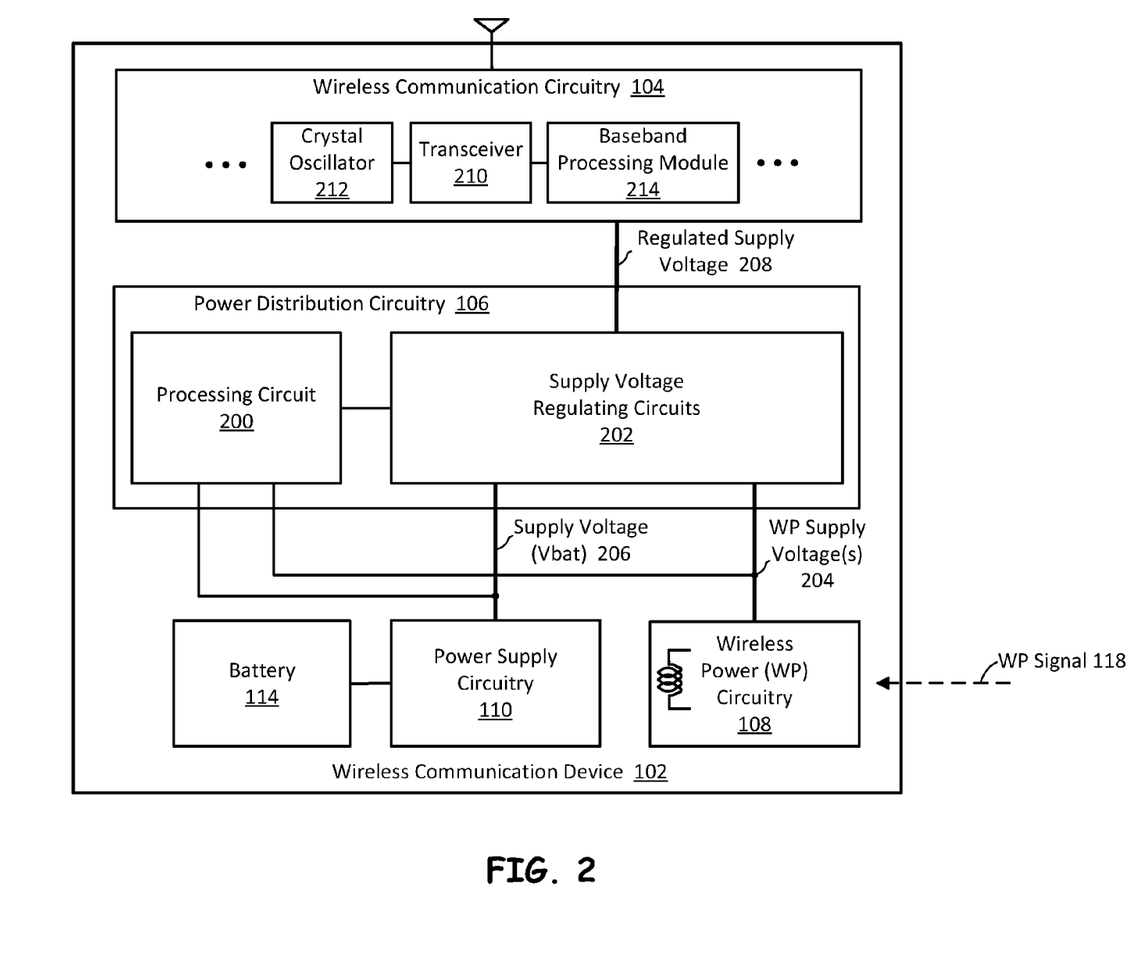
FIG. 2 is a schematic block diagram representation of an embodiment of a wireless communication device incorporating exemplary power distribution circuitry.

FIG. 2 is a schematic block diagram representation of an embodiment of a wireless communication device 102 incorporating exemplary power distribution circuitry 106. In the illustrated embodiment, the power distribution circuitry 106 includes a processing circuit 200 and a plurality of supply voltage regulating circuits 202 for selectively providing one or more regulated supply voltages 208 to power at least a portion of the wireless communication circuitry 104.

The processing circuit 200 may operate in accordance with predetermined criteria (such as described below in conjunction with FIG. 8) to determine whether the regulated supply voltage 208 is generated from either a WP supply voltage 204 or another supply voltage 206 (e.g., a battery-derived supply voltage). For example, in certain exemplary embodiments the processing circuit 200 may be configured to detect a low power condition wherein the wireless communication circuitry 104 and the power supply circuitry 110 are not enabled, but the WP circuitry 108 is receiving a WP signal 118 and a WPT connection procedure is desired. When the wireless communication device 102 is in this state, the processing circuit 200 may enable selected circuits (e.g., linear regulators) of the supply voltage regulating circuits 202 to utilize a WP supply voltage 204 to generate the regulated supply voltage 208. In other exemplary power states, such as when the power supply circuitry 110 is enabled and/or battery 114 is sufficiently charged, the processing circuit 200 may configure the supply voltage regulating circuits 202 to utilize the supply voltage 206 to generate the regulated supply voltage 208. In various embodiments, the processing circuit 200 is powered by a WP supply voltage 204.

The wireless communication circuitry 104 includes elements for supporting a WPT connection procedure to facilitate wireless power transfer operations, including a transceiver 210 operably coupled to a crystal oscillator circuit 212 and baseband processing module 214. As described above, such elements may support a specific wireless communication standard, such as a Bluetooth™/Bluetooth™ LE standard. In addition, various elements of wireless communication circuitry 104 may have independent and/or shared power distribution feeds for receiving the regulated supply voltage 208.

Figure 3:
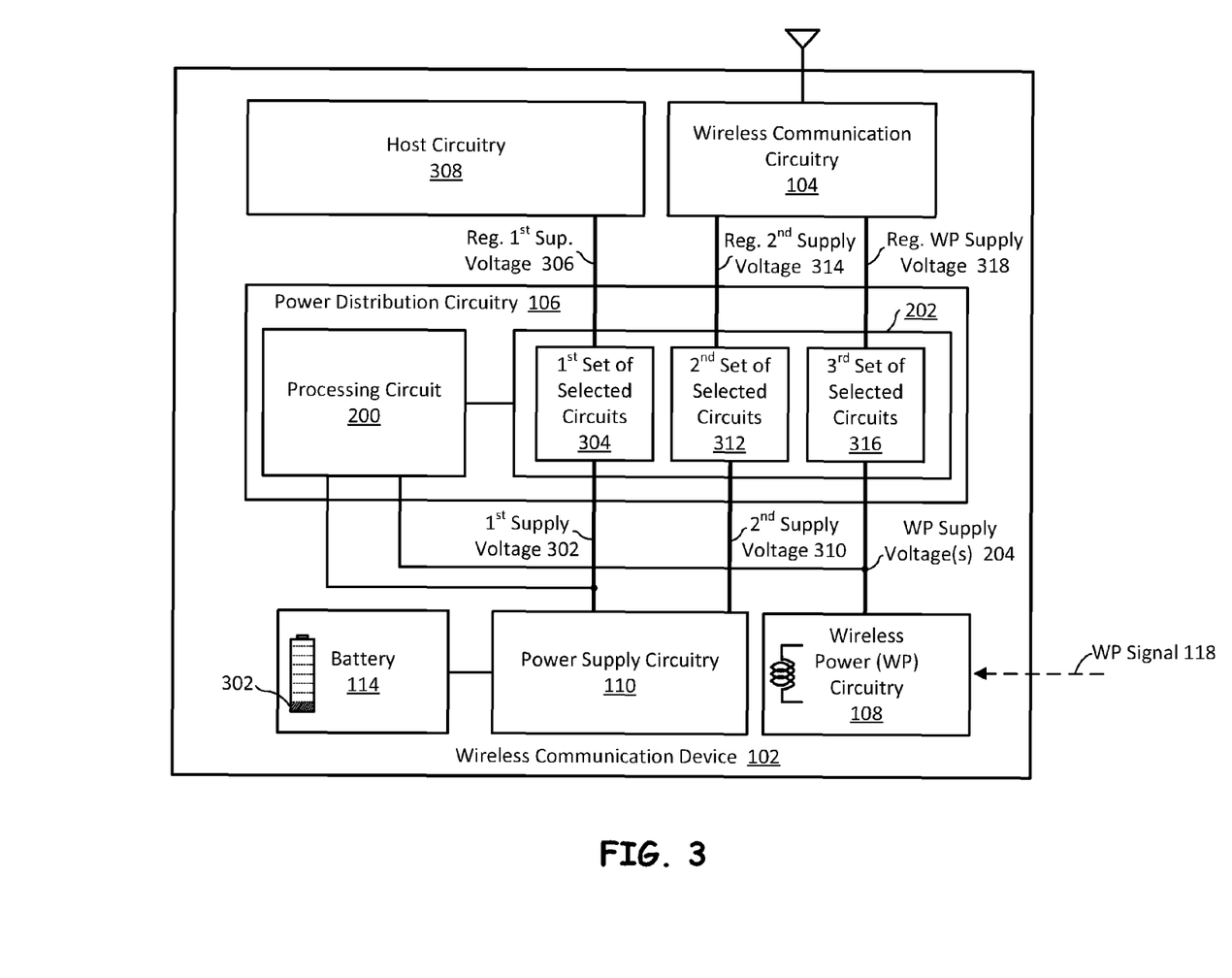
FIG. 3 is a schematic block diagram of another embodiment of a wireless communication device incorporating exemplary power distribution circuitry.

FIG. 3 is a schematic block diagram of another embodiment of a wireless communication device 102 incorporating exemplary power distribution circuitry 106. In this embodiment, the power distribution circuitry 106 is configured to selectively distribute a first supply voltage 302 to a first set of selected circuits 304, a second supply voltage 310 to a second set of selected circuits 312, and a WP supply voltage 204 to a third set of selected circuits 316 of the power distribution circuitry 106. The first supply voltage 302 and the second supply voltage 310 of the illustrated embodiment are generated by the power supply circuitry 110, while the WP supply voltage 204 is provided by the WP circuitry 108.

Figure 8:
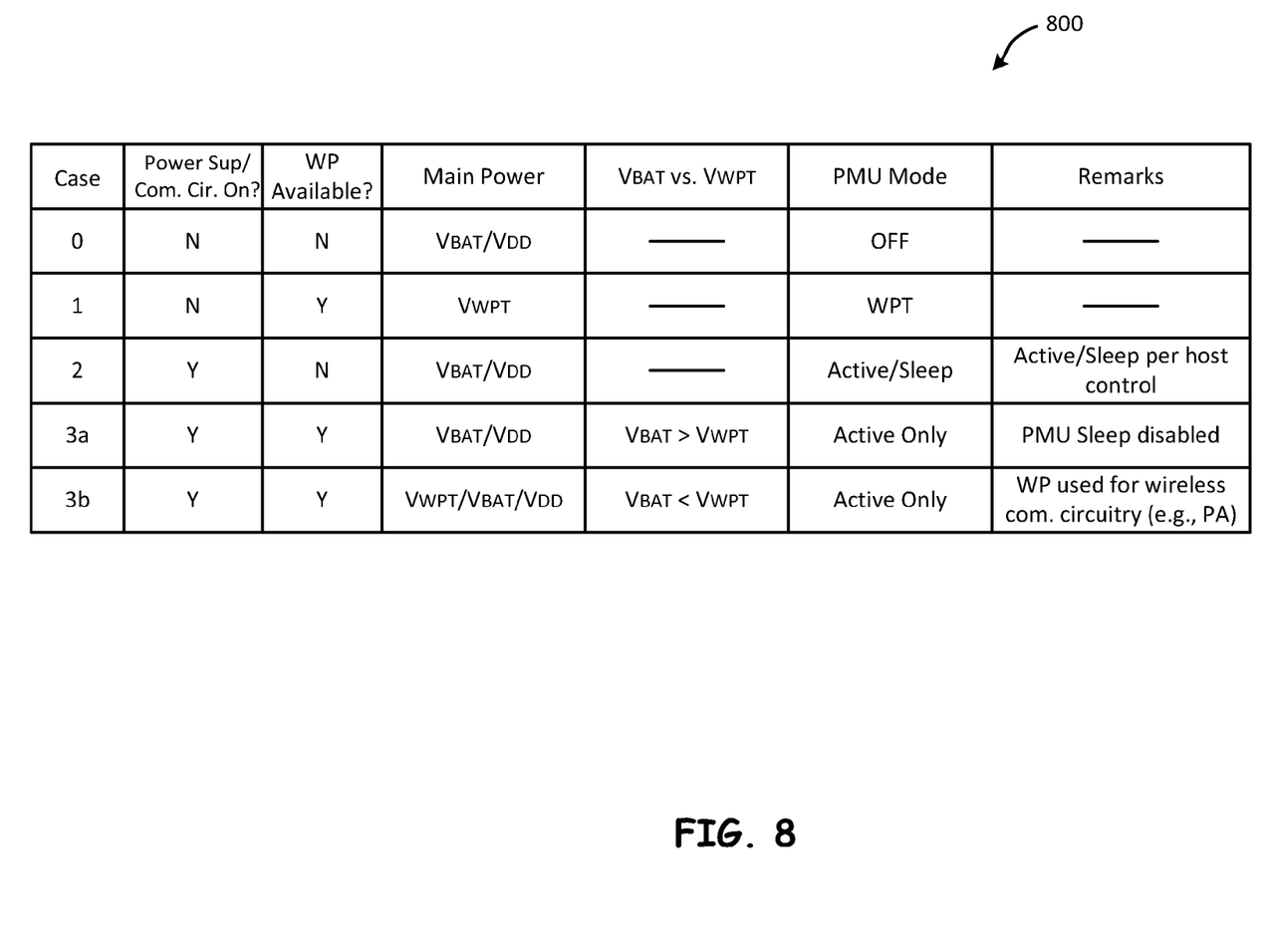
FIG. 8 is a logic table illustrating exemplary operation of the power distribution circuitry under various power conditions.

In this embodiment, the first set of selected circuits 304 generates a regulated first supply voltage 306 for use by host circuitry 308 of the wireless communication device 102. The host circuitry 308 may include, for example, a read only memory (ROM) for storing instructions for use by the processing circuit 200 to implement a logic table such as shown in FIG. 8, as well as other circuitry and logic that may be utilized in wireless power in accordance with the present disclosure. In the illustrated embodiment, the wireless communication circuitry 104 (or various portions thereof) may be powered by a regulated second supply voltage 314 generated by the second set of selected circuits 312 and/or a regulated WP supply voltage 318 generated by the third set of selected circuits 316.

For example, if the battery voltage is in a first state 302 (e.g., below a threshold voltage level) and the wireless communication circuitry 104 and the power supply circuitry 110 are enabled, a mode transition may be performed by the power distribution circuitry 106 wherein portions of the wireless communication circuitry 104 that were receiving the regulated WP supply voltage 318 are instead provided with the regulated first supply voltage 306. Such a transition may increase the amount of wireless power available to charge the battery 114. Further, when the battery voltage reaches a second state (e.g., above a threshold voltage level or a fully charged state), use of the regulated WP supply voltage 318 to power the wireless communication circuitry 104 may be further reduced.

It is noted that the regulated voltages produced by supply voltage regulating circuits 202 may be of various voltage levels depending, for example, on the type and manufacture of the circuitry that is receiving a given regulated voltage. For example, portions of the host circuitry 308 may require a supply voltage having a first voltage level (e.g., 1.2V or 1.8V for core digital logic), while analog circuitry of the wireless communication circuitry 104 may require a second voltage level (e.g., 3.3V) for proper operation. In certain embodiments, each of the power supply circuitry 110 and the WP circuitry 108 may produce a plurality of supply voltages of differing voltage levels.

Figure 4:
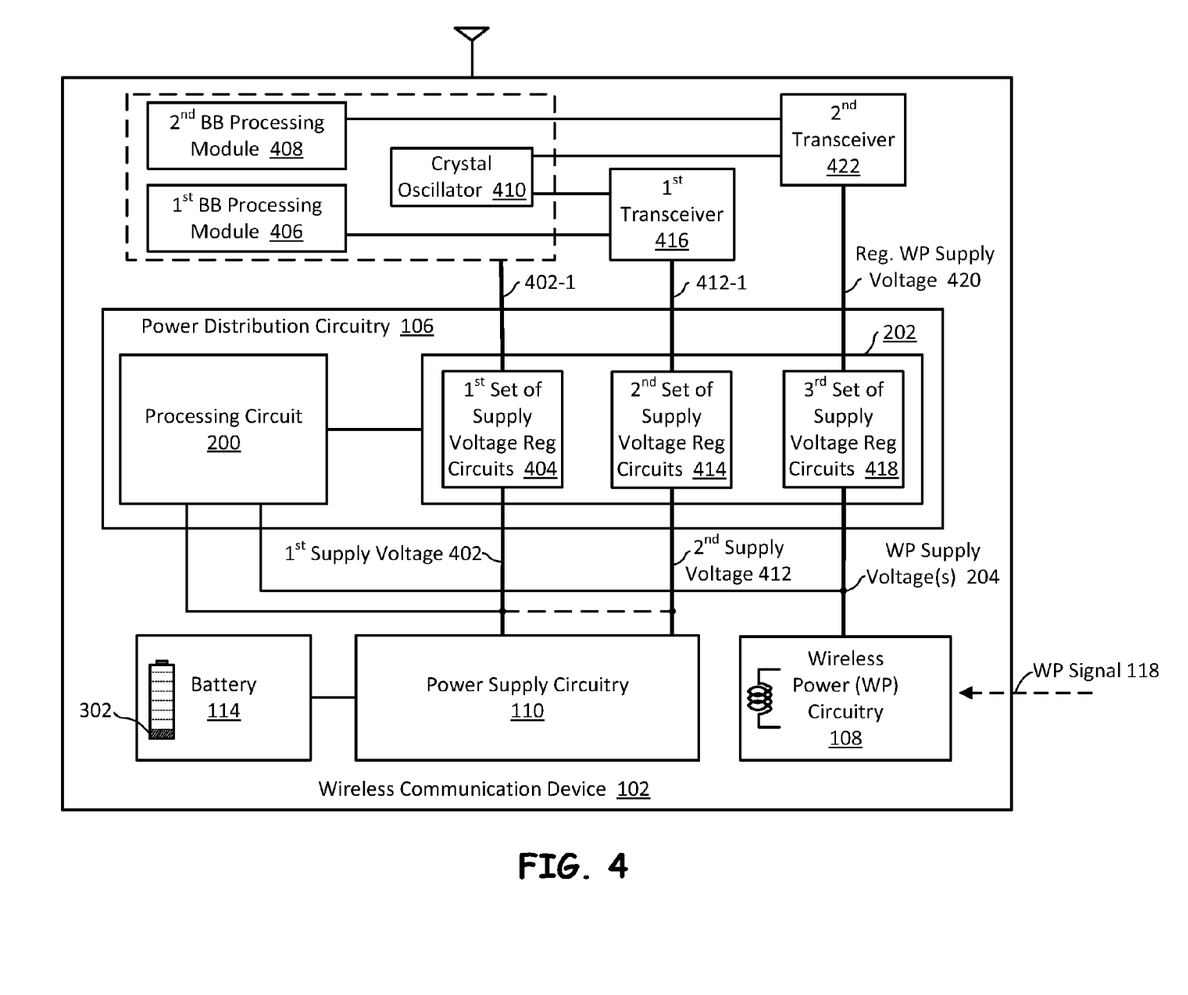
FIG. 4 is a schematic block diagram of another embodiment of a wireless communication device incorporating exemplary power distribution circuitry and exemplary communication circuitry.

FIG. 4 is a schematic block diagram of another embodiment of a wireless communication device 102 incorporating exemplary power distribution circuitry 106 and exemplary communication circuitry. In this embodiment, the communication circuitry comprises a first baseband (BB) processing module 406 operably coupled to a first transceiver 416, and a second BB processing module 408 operably coupled to a second transceiver 422. The first and second transceivers 416 and 422 are further coupled to a crystal oscillator reference circuit 410. In operation, the first and second transceivers 416 and 422 and associated circuitry may support one or more wireless communication standards, such as the aforementioned standards. For example, a communication link supported by the first transceiver 416 may comply with a WiFi™, standard, while a communication link supported by the second transceiver 422 may comply with a Bluetooth™/Bluetooth™ LE standard or other standard that supports relevant WPT connection procedures.

In the illustrated embodiment, a first supply voltage 402 and a second supply voltage 412 are generated by the power supply circuitry 110, while a WP supply voltage 204 is provided to the power distribution circuitry 106 by the WP circuitry 108. When selected by the processing circuit 200, a first set of supply voltage regulating circuits 404 generates a regulated first supply voltage(s) 402-1 for provision to the first and second BB processing modules 406 and 408 and the crystal oscillator reference circuit 410. Likewise, a second set of supply voltage regulating circuits 414 generates a regulated second supply voltage(s) 412-1 for provision to the first transceiver 416, while a third set of supply voltage regulating circuits 418 may be selected to generate a regulated WP supply voltage(s) 420 to enable the second transceiver 422. In certain exemplary embodiments, the processing circuit 200 is configured to monitor and selectively distribute the various supply voltages to the first, second and third sets of supply voltage regulating circuits 404, 414, and 418 in accordance with a logic table such as the logic table of FIG. 8.

Figure 5:
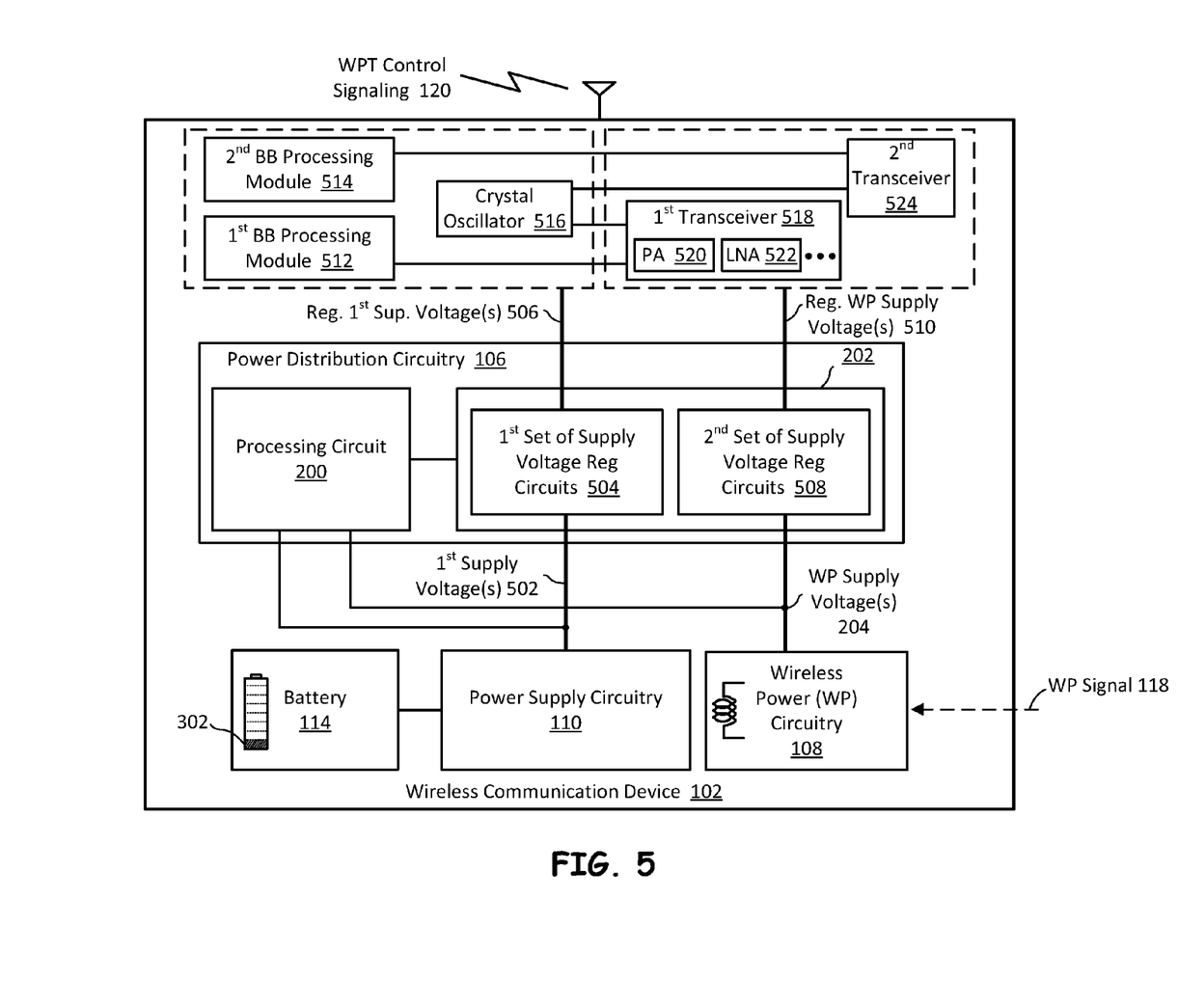
FIG. 5 is a schematic block diagram of another embodiment of a wireless communication device incorporating exemplary power distribution circuitry and exemplary communication circuitry.

FIG. 5 is a schematic block diagram of another embodiment of a wireless communication device 102 incorporating exemplary power distribution circuitry 106 and exemplary communication circuitry. In the illustrated embodiment, the communication circuitry comprises a first baseband (BB) processing module 512 operably coupled to a first transceiver 518, and a second BB processing module 514 operably coupled to a second transceiver 524. The first and second transceivers 518 and 524 are further coupled to a crystal oscillator reference circuit 516. In addition to other RF front end circuitry, the first transceiver 518 includes a power amplifier (PA) 520 and an RF or low-noise amplifier (LNA) 522. In some implementations, the PA 520 and/or the LNA 522 may have independent power distribution feeds for receiving regulated supply voltages from the supply voltage regulating circuits 202.

In the illustrated embodiment, at least one first supply voltage 502 is generated by the power supply circuitry 110, and at least one WP supply voltage 204 is provided to the power distribution circuitry 106 by the WP circuitry 108. When selected or otherwise enabled by the processing circuit 200, a first set of supply voltage regulating circuits 504 generates a regulated first supply voltage(s) 506 for provision to the first and second BB processing modules 512 and 514 as well as the crystal oscillator reference circuit 516. Likewise, a second set of supply voltage regulating circuits 508 generates a regulated WP supply voltage(s) 510 for provision to the first and second transceivers 518 and 524.

In certain exemplary embodiments, the processing circuit 200 is configured to monitor and selectively distribute the first supply voltage 502 and the WP supply voltage 204 in accordance with a logic table such as the logic table of FIG. 8. For example, during a WPT connection procedure with WPT source device 116, the processing circuit 200 may cause a WP supply voltage 204 to be distributed to one or more circuits of the second set of supply voltage regulating circuits 508 (e.g., a linear regulator, DC-to-DC converter, or the like) in order to enable the first transceiver 518 to send and/or receive WPT control signaling 120. Upon detecting that the power supply circuitry 110 is enabled and the battery voltage is in a first state 302 (e.g., below a threshold voltage level or less than the voltage level of a WP supply voltage 204), the processing circuit 200 may then limit distribution of one or more regulated WP supply voltages 510 to a subset of the elements of the first transceiver 518, such as the PA 520, in order to improve the availability of wireless power for use in charging the battery 114. Such operations may be performed seamlessly, without a need to power cycle the wireless communication device 102.

In various embodiments in which a Bluetooth compliant link is utilized for WPT connection procedures, traditional pairing may or may not be necessary. Further, WPT operations in certain embodiments may leverage a Bluetooth generic attribute profile and generic access profile and a Bluetooth LE controller for efficient discovery and device connection support.

Figure 6:
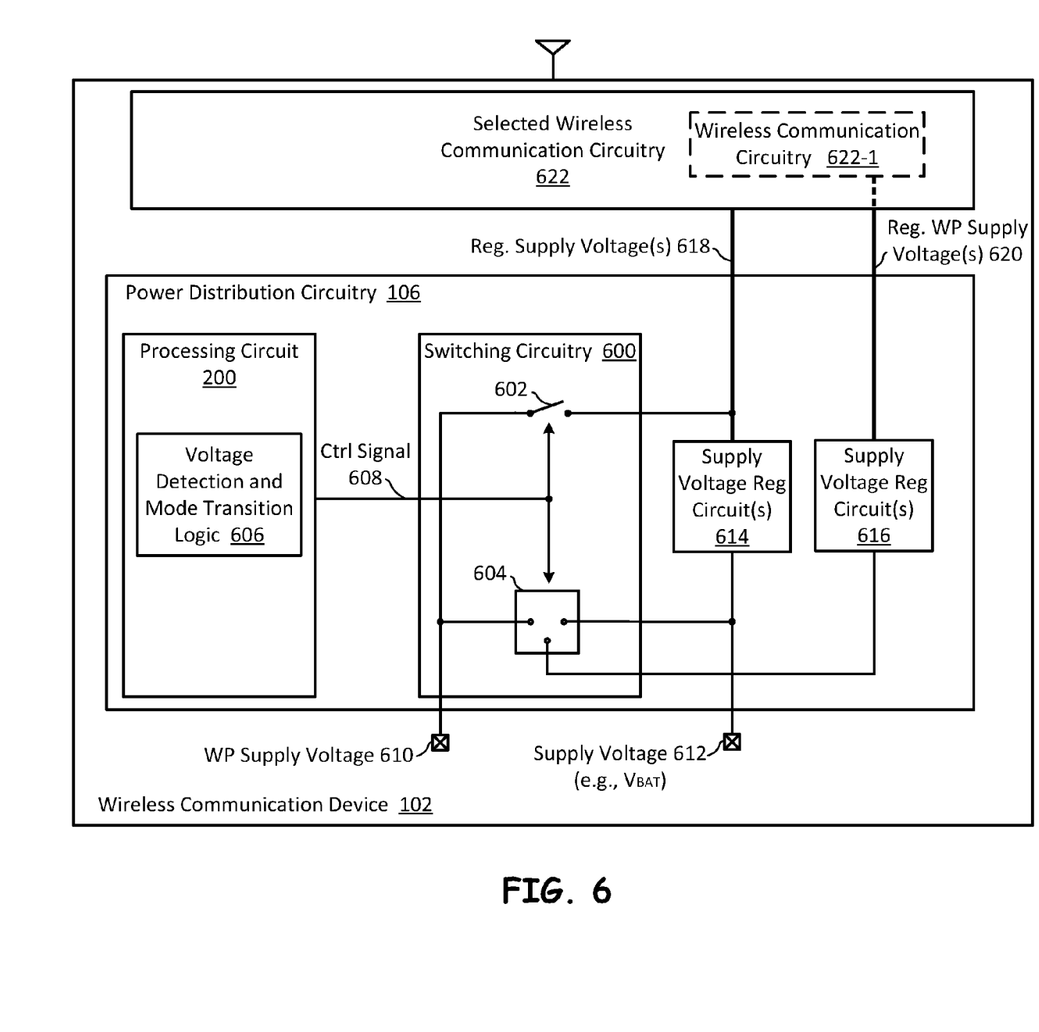
FIG. 6 is a schematic block diagram of a further embodiment of a wireless communication device incorporating exemplary power distribution circuitry including exemplary switching circuitry.

FIG. 6 is a schematic block diagram of a further embodiment of a wireless communication device 102 incorporating exemplary power distribution circuitry 106 including switching circuitry 600. In this embodiment, the processing circuit 200 of the power distribution circuitry 106 includes voltage detection and mode transition logic 606 that may be configured to monitor various supply voltages and generate one or more switch control signals 608 in response to certain operating conditions.

For example, the voltage detection and mode transition logic 606 can be configured to detect when power supply circuitry 110 is disabled by monitoring a supply voltage 612 or other voltage provided by such circuitry. Likewise, a WP supply voltage 610 may be monitored to determine when WP circuitry 108 is receiving a wireless power signal 118. In the illustrated embodiment, when such conditions are identified the processing circuit 200 is configured to assert a control signal 608 that causes switching circuitry 600 to power selected communication circuitry of the device in order to facilitate battery charging operations.

More particularly, the switching circuitry 600 includes a first switch 602 and a second switch 604 that are configured to selectively provide the WP supply voltage 610 to selected wireless communication circuitry 622 based on the control signal 608. In some embodiments wherein the power supply circuitry 110 is not enabled, when the control signal 608 is asserted, the first switch 602 is closed and the WP supply voltage 610 is provided directly to selected wireless communication circuitry 622. In addition, when the control signal 608 is asserted, the second switch 604 may be operable to provide the WP supply voltage 610 to supply voltage regulating circuit(s) 616 in order to generate one or more regulated supply voltages 620 for use by a portion of the wireless communication circuitry 622-1.

In some embodiments wherein when power supply circuitry 110 is enabled (and a supply voltage 612 is available), and a WP supply voltage 610 is also available, the control signal 608 is not asserted and the first switch 602 is open. In this instance, the supply voltage 612 is received by supply voltage regulating circuit(s) 614 to generate one or more regulated supply voltages 618 for powering the selected wireless communication circuitry. The second switch 604 may be operable to distribute the WP supply voltage 610 to supply voltage regulating circuit(s) 616 in order to generate one or more regulated supply voltages 620 for use by a portion (e.g., a power amplifier) of the wireless communication circuitry 622-1.

In some embodiments, the supply voltage regulating circuit(s) 614 and 616 include a plurality of linear regulators or low-dropout (LDO) regulators. As is known, an LDO regulator varies its internal resistance (e.g., using an error amplifier) in accordance with a load to provide a well specified and fairly steady output voltage, and operates with a very small input-output differential voltage, or "dropout" voltage, such that the output voltage generally tracks the input voltage. In addition, the power distribution circuitry 106 may utilize various combinations of integrated and/or discrete output components such as transistors, capacitors and inductors. For example, components of the power distribution circuitry 106 may be formed on a common substrate and housed in an integrated circuit package.

Figure 7:
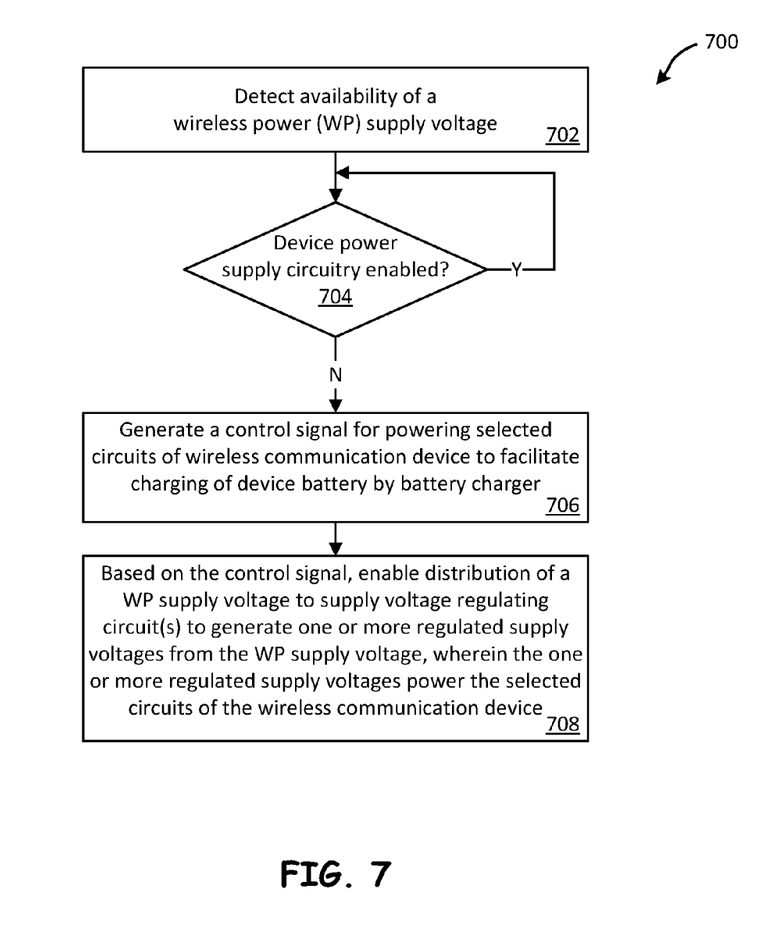
FIG. 7 is an operational flow diagram illustrating an exemplary method for distributing power within a wireless communication device having wireless power transfer capabilities.

FIG. 7 is an operational flow diagram illustrating an exemplary method 700 for distributing power within a wireless communication device having wireless power transfer capabilities. In the illustrated method, the availability or potential availability of a wireless power (WP) supply voltage is identified by a processing circuit of the wireless communication device (702). Next, or in conjunction therewith, the processing circuit (or other circuitry within the wireless communication device) detects whether power supply circuitry of the device is enabled (704). If the power supply circuitry is not enabled, and a WP supply voltage is available, the processing circuit generates a control signal for powering selected circuits of the wireless communication device in order to facilitate charging of a device battery by a battery charger (706).

Next (708), the control signal is utilized to enable distribution of a WP supply voltage to supply voltage regulating circuit(s) to generate one or more regulated supply voltages from the WP supply voltage, wherein one or more of the regulated supply voltages are utilized to power the selected circuits of the wireless communication device. As described above, the selected circuits might include, for example, communication circuitry that is configured to establish a standards specific communication link with a WPT source device in order to support WPT operations. Also, as described generally herein, additional power mode transitions may occur as the device battery progresses through a charge cycle, etc.

FIG. 8 is a logic table 800 illustrating exemplary operation of the power distribution circuitry 106 under various power conditions/power mode selection criteria. Such power conditions may include the status of power supply circuitry 110 and select communication circuitry; the availability of wireless power; the relative magnitudes of a supply voltage and a WP supply voltage ($V_{WPT}$); the operational state of a system power management circuitry (e.g., a PMU); etc. The logic table may be performed, for example, by logic of the processing circuitry 200 of the power distribution circuitry 106. In certain embodiments, instructions for performing power distribution operations in accordance with the logic table may be stored in a memory device(s) of the power distribution circuitry 106 or other memory of the wireless communication device 102 that is capable of being enabled by a WP supply voltage.

Referring more specifically to FIG. 8, exemplary cases are illustrated. In case 0, the wireless communication device 102 is powered off and no wireless power is available. In case 1, the power supply circuitry 110 and select communication circuitry are off (e.g., a primary supply voltage ($V_{DD}$) is unavailable and the battery voltage ($V_{BAT}$) is too low to support device operation) and wireless power is available, such as may occur when the wireless communication device 102 is off but has been placed on a WPT charging station. In this scenario, power to necessary device subsystems is provided by $V_{WPT}$. Under case 2, wireless power is not available but either $V_{DD}$ or $V_{BAT}$ is available to power the device. In this case, the PMU may be in either an active or sleep mode.

In exemplary cases 3a and 3b, a WPT supply voltage is available, as well as either $V_{DD}$ or $V_{BAT}$. In these cases, the battery is charging and the PMU remains in an active mode.

In case 3a, the voltage level of $V_{BAT}$ is greater than the voltage level of $V_{WPT}$. Under these conditions, the battery voltage may be considered to be in an operational range, and main power is supplied by one of $V_{BAT}$ or $V_{DD}$. If the voltage level of $V_{BAT}$ is less than the voltage level of $V_{WPT}$ (case 3b), the battery is considered to be in a low battery state. In order to improve battery charging efficiency in this case, the WP supply voltage $V_{WPT}$ is utilized to power select wireless communication circuitry (such as a power amplifier) until the voltage level of $V_{BAT}$ exceeds $V_{WPT}$ or another voltage threshold level.

As may be used herein, the term "associated with", includes direct and/or indirect association of separate items and/or one item being embedded within another item. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to" or "operably coupled to" indicates that an item includes one or more of power connections, input(s), output(s), etc., to perform, when activated, one or more its corresponding functions and may further include inferred coupling to one or more other items.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

As may also be used herein, the terms "processing module", "processing circuit", "processor" and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of the present disclosure have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed subject matter. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the claimed subject matter. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Various switches are shown in the above described figure(s). As one of ordinary skill in the art will appreciate, the switches may be implemented using any type of transistor structure including, but not limited to, field effect transistors (FETs), bipolar transistors, metal oxide semiconductor field effect transistors (MOSFET), N-well transistors, P-well transistors, and enhancement mode, depletion mode, and zero voltage threshold (VT) transistors.

Unless specifically stated to the contrary, signals to, from, and/or between elements in a figure presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A wireless communication device comprising:
    wireless communication circuitry configured, when enabled, to process a signal for wireless communication;
    power supply circuitry configured, when enabled, to generate one or more battery supply voltages from a battery voltage;
    a battery charger configured, when enabled, to charge a battery that supplies the battery voltage;
    wireless power circuitry configured, when receiving a wireless power signal, to generate a wireless power (WP) supply voltage; and
    a power distribution circuit configured to:
        when the wireless communication circuitry and the power supply circuitry are not enabled and the wireless power circuitry is receiving the wireless power signal, and when the battery voltage is below a device enabling threshold voltage level, distribute the WP supply voltage to selected circuits within the wireless communication device to enable a wireless communication channel and control signaling with an external source of the wireless power signal to support a wireless power transfer (WPT) connection procedure with the external source that facilitates charging of the battery by the battery charger, the power distribution circuit including:
            a processing circuit to detect when the wireless communication circuitry and the power supply circuitry are not enabled and when the wireless power circuitry is receiving the wireless power signal; and
            a plurality of supply voltage regulating circuits, wherein one or more of the plurality of supply voltage regulating circuits are included in the selected circuits and generate one or more additional supply voltages from the WP supply voltage.

2. The wireless communication device of claim 1, wherein the power distribution circuit is configured to detect when the wireless communication circuitry and the power supply circuitry are not enabled by at least one of:
    detecting when the wireless communication device is in a power off mode; or
    detecting when the wireless communication device is in a sleep mode.

3. The wireless communication device of claim 1, the wireless communication circuitry including:
    a crystal oscillator circuit;
    a baseband processing module; and
    a transceiver operably coupled to the crystal oscillator circuit and to the baseband processing module, wherein the crystal oscillator circuit, the baseband processing module, and the transceiver are powered by the one or more of the plurality of supply voltage regulating circuits and facilitate communication between the wireless power circuitry and the external source of the wireless power signal.

4. The wireless communication device of claim 1, wherein the one or more battery supply voltages include a plurality of battery supply voltages, and wherein the power distribution circuit is further configured to:
    when the wireless communication circuitry and the power supply circuitry are enabled, when the wireless power circuitry is receiving the wireless power signal, and when the battery voltage is below a threshold voltage level:
        distribute a first supply voltage of the plurality of battery supply voltages to a first set of selected circuits of the wireless communication device;
        distribute a second supply voltage of the plurality of battery supply voltages to a second set of selected circuits of the wireless communication device; and
        distribute the WP supply voltage to a third set of selected circuits of the wireless communication device.

5. The wireless communication device of claim 4, wherein the processing circuit is further configured to determine when the battery voltage is below the threshold voltage level, and wherein:
    a first set of the plurality of supply voltage regulating circuits are included in the first set of selected circuits and generate one or more additional supply voltages from the first supply voltage;
    a second set of the plurality of supply voltage regulating circuits are included in the second set of selected circuits and generate one or more additional supply voltages from the second supply voltage; and
    a third set of the plurality of supply voltage regulating circuits are included in the third set of selected circuits and generate one or more additional supply voltages from the WP supply voltage; and
    the wireless communication circuitry including:
        a crystal oscillator circuit;
        a first baseband processing module;
        a first transceiver operably coupled to the crystal oscillator circuit and to the first baseband processing module;
        a second baseband processing module; and
        a second transceiver operably coupled to the crystal oscillator circuit and to the first baseband processing module, wherein the crystal oscillator circuit, the first baseband processing module, and the second baseband processing module are powered by the one or more additional supply voltages generated from the first supply voltage,
    wherein the first transceiver is powered by the one or more additional supply voltages generated from the second supply voltage, and
    wherein the second transceiver is powered by the one or more additional supply voltages generated from the WP supply voltage.

6. The wireless communication device of claim 1, wherein the processing circuit is further configured to detect when the wireless communication circuitry and the power supply circuitry are enabled, when the wireless power circuitry is receiving the wireless power signal, and when the battery voltage is below a threshold voltage level and, in response:
    distribute a first supply voltage of the one or more battery supply voltages to a first set of selected circuits of the wireless communication device; and
    distribute the WP supply voltage to a second set of selected circuits of the wireless communication device; and wherein:
a first set of the plurality of supply voltage regulating circuits are included in the first set of selected circuits and generate one or more additional supply voltages from the first supply voltage; and
a second set of the plurality of supply voltage regulating circuits are included in the second set of selected circuits and generate one or more additional supply voltages from the WP supply voltage;
the wireless communication circuitry including:
a crystal oscillator circuit;
a first baseband processing module;
a first transceiver operably coupled to the crystal oscillator circuit and to the first baseband processing module;
a second baseband processing module; and
a second transceiver operably coupled to the crystal oscillator circuit and to the first baseband processing module, wherein the crystal oscillator circuit, the first baseband processing module, and the second baseband processing module are powered by the one or more additional supply voltages generated from the first supply voltage, and
wherein the first and the second transceivers are powered by the one or more additional supply voltages generated from the WP supply voltage.

7. The wireless communication device of claim 1, wherein the processing circuit is further configured to:
detect when the wireless communication circuitry and the power supply circuitry are enabled, when the wireless power circuitry is receiving the wireless power signal, and when the battery voltage is above a threshold voltage level and, when each of said conditions is detected, distribute the one or more battery supply voltages to circuits of the wireless communication device.

8. A power distribution circuit for use in a device having wireless communication circuitry, power supply circuitry, a battery charger, a battery, and wireless power (WP) circuitry, the power distribution circuit comprising:
a processing circuit configured to:
detect when the power supply circuitry is not enabled, when a battery voltage of the battery is below a device enabling threshold voltage level, and when the WP circuitry is receiving a wireless power signal, wherein the WP circuitry generates a WP supply voltage from the wireless power signal; and
when each of said conditions is detected, generate a control signal for powering selected circuits of the device to enable a wireless communication channel and control signaling with an external source of the wireless power signal to support a wireless power transfer (WPT) connection procedure with the external source that facilitates charging of the battery by the battery charger;
a plurality of supply voltage regulating circuits; and
switching circuitry configured to provide the WP supply voltage to one or more of the plurality of supply voltage regulating circuits based on the control signal, wherein the one or more of the plurality of supply voltage regulating circuits generates one or more additional supply voltages from the WP supply voltage, and wherein the one or more additional supply voltages power the selected circuits.

9. The power distribution circuit of claim 8, wherein the selected circuits comprising one or more of:
a crystal oscillator circuit of the wireless communication circuitry;
a baseband processing module of the wireless communication circuitry; and
a transceiver of the wireless communication circuitry, wherein the transceiver is operably coupled to the crystal oscillator circuit and to the baseband processing module, wherein the crystal oscillator circuit, the baseband processing module, and the transceiver facilitate communication between the WP circuitry and the external source of the wireless power signal.

10. The power distribution circuit of claim 8, wherein:
the processing circuit is further configured to detect when the power supply circuitry is enabled to generate a battery supply voltage from the battery voltage, when a WP supply voltage is available, and when the battery voltage is in a first state, and when each of said conditions is detected, generate the control signal for powering a first set of selected circuits and a second set of selected circuits; and
the switching circuitry is further configured to provide the supply voltage to a first set of the plurality of supply voltage regulating circuits and to provide the WP supply voltage to a second set of the plurality of supply voltage regulating circuits based on the control signal, wherein the first set of the plurality of supply voltage regulating circuits generates a first one or more additional supply voltages for powering the first set of selected circuits, and wherein the second set of the plurality of supply voltage regulating circuits generates a second one or more additional supply voltages for powering the second set of selected circuits.

11. The power distribution circuit of claim 10, wherein the second set of selected circuits of the wireless communication circuitry comprising a power amplifier.

12. The power distribution circuit of claim 10, wherein, in the first state, the battery voltage is less than a voltage level threshold.

13. The power distribution circuit of claim 8, wherein:
the processing circuit is further configured to detect when the power supply circuitry is enabled to generate a battery supply voltage from the battery voltage, when the wireless communication circuitry is enabled, when the WP supply voltage is available, and when the battery voltage is above a threshold voltage level, and when each of said conditions is detected, generate the control signal for powering circuits of the device; and
the switching circuitry is further configured to provide the battery supply voltage to a set of the plurality of supply voltage regulating circuits based on the control signal, wherein the set of the plurality of supply voltage regulating circuits generates one or more additional supply voltages from the battery supply voltage to power the circuits.

14. The power distribution circuit of claim 8 further comprising:
a substrate for supporting the processing circuit, the plurality of supply voltage regulating circuits, and the switching circuitry; and
an integrated circuit package for housing the substrate.

15. A method for execution by a processing circuit for distributing power within a wireless communication device having a battery for battery powered operation, the method comprising:
detecting when power supply circuitry of the wireless communication device is not enabled, when wireless power circuitry of the wireless communication device is generating a wireless power (WP) supply voltage, and when a battery voltage of the battery is below a device enabling threshold voltage level;

when each of said conditions is detected, generating a control signal for powering selected circuits of the wireless communication device to enable a wireless communication channel and control signaling with an external source of wireless power to facilitate a wireless power transfer (WPT) connection procedure with the external source of wireless power that facilitates charging of the battery by a battery charger; and enabling distribution of the WP supply voltage to one or more of a plurality of supply voltage regulating circuits based on the control signal, wherein the one or more of the plurality of supply voltage regulating circuits generates one or more additional supply voltages from the WP supply voltage, and wherein the one or more additional supply voltages power the selected circuits.

16. The method of claim 15, wherein the selected circuits of the wireless communication device comprising:
a crystal oscillator circuit;
a baseband processing module; and
a transceiver operably coupled to the crystal oscillator circuit and to the baseband processing module.

17. The method of claim 15 further comprising:
detecting when the power supply circuitry is enabled to generate a battery supply voltage from the battery voltage, when a WP supply voltage is available, and when the battery voltage is in a first state, and when each of said conditions is detected, generate the control signal for powering a first set of selected circuits and a second set of selected circuits; and enabling distribution of the battery supply voltage to a first set of the plurality of supply voltage regulating circuits and the WP supply voltage to a second set of the plurality of supply voltage regulating circuits based on the control signal, wherein the first set of the plurality of supply voltage regulating circuits generates a first one or more additional supply voltages for powering a first set of selected circuits, and wherein the second set of the plurality of supply voltage regulating circuits generates a second one or more additional supply voltages for powering a second set of selected circuits.

18. The method of claim 17, wherein, in the first state, a voltage level of the battery voltage is less than a voltage level threshold.

19. The method of claim 15 further comprising:
detecting when the power supply circuitry is enabled to generate one or more battery supply voltages from the battery voltage, when the wireless power circuitry is generating a WP supply voltage, and when the battery voltage is above a threshold voltage level; and when each of said conditions is detected, enabling distribution of the one or more battery supply voltages to power circuits of the wireless communication device.

20. The method of claim 15, wherein detecting that the power supply circuitry of the wireless communication device is not enabled comprising at least one of:
detecting when the wireless communication device is in a power off mode; or
detecting when the wireless communication device is in a sleep mode.

* * * * *